United States Patent
Paul et al.

(10) Patent No.: US 10,015,270 B2
(45) Date of Patent: *Jul. 3, 2018

(54) TRANSMITTING NOTIFICATIONS TO USERS IN A VENUE BASED ON LOCATIONS OF USERS WITHIN THE VENUE

(71) Applicant: VenueNext, Inc., Santa Clara, CA (US)

(72) Inventors: John M. Paul, Palo Alto, CA (US); Deepak Jhalani, Jersey City, NJ (US); Dean Yang, New York, NY (US)

(73) Assignee: VenueNext, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,393

(22) Filed: Oct. 4, 2017

(65) Prior Publication Data

US 2018/0048728 A1     Feb. 15, 2018

Related U.S. Application Data (63) Continuation of application No. 15/236,098, filed on Aug. 12, 2016, now Pat. No. 9,807,186.

(51) Int. Cl.
*H04W 24/00*     (2009.01)
*H04L 29/08*     (2006.01)
*H04W 4/04*     (2009.01)
*H04W 4/021*     (2018.01)

(52) U.S. Cl.
CPC .............. *H04L 67/26* (2013.01); *H04L 67/10* (2013.01); *H04L 67/12* (2013.01); *H04L 67/18* (2013.01); *H04W 4/021* (2013.01); *H04W 4/04* (2013.01)

(58) Field of Classification Search
CPC ........................................................ H04L 67/26
USPC ........................................................ 455/456.3
See application file for complete search history.

(56) References Cited

U.S. PATENT DOCUMENTS

2006/0085419 A1     4/2006    Rosen

*Primary Examiner* — Joel Ajayi
(74) *Attorney, Agent, or Firm* — Fenwick & West LLP (57) ABSTRACT

To improve communication with users, a venue management system is associated with the venue and allows an administrator to configure notifications to send to users at or near the venue. To configure a notification, the administrator provides to the venue management system notification information for presentation to users, criteria describing conditions need to be satisfied for the notification to be transmitted to users, and user targeting information identifying characteristics of users to receive the notification. Based on information gathered by the venue management system, the venue management system determines whether at least a threshold amount of the criteria of the notification are satisfied. If at least the threshold amount of the criteria of the notification are satisfied, the venue management system sends the notification to users having characteristics matching at least a threshold amount of the user targeting information.

16 Claims, 3 Drawing Sheets

TRANSMITTING NOTIFICATIONS TO USERS IN A VENUE BASED ON LOCATIONS OF USERS WITHIN THE VENUE

CROSS REFERENCE TO RELATED APPLICATIONS

This application is a continuation of U.S. application Ser. No. 15/236,098, filed Aug. 12, 2016, which is incorporated by reference in its entirety.

BACKGROUND

This invention relates generally to notifications, and more specifically to providing notifications to users located at or near a venue.

Venues such as stadiums, convention centers, or amphitheaters frequently host events that large numbers of users attend. Situations arise where the host of an event at a venue needs to provide information to users attending the event. For example, the host wants to notify users that the event is about to begin or wants to provide promotional information to users. Traditionally, this information is provided to users through sound systems or video boards within the venue. However, sound systems and video boards have limited reach within the venue. For example, there may be locations at the venue where a video board is not visible to users or where audio from a sound system cannot be clearly heard by users. Further, these conventional methods of communicating with users at a venue do not allow a host of an event at the venue to target information to specific users at the venue, limiting the host's ability to provide different information to different users at the venue.

SUMMARY

A venue is a geographic location, such as a geographic location associated with one or more structures. Examples of a venue include a stadium, a convention center, an arena, a theater, an amphitheater, a theme park or other suitable structure or location where people may gather for an event. In various embodiments, users obtain a ticket to enter the venue, and one or more events are performed or hosted at the venue. Additionally, one or more vendors are associated with the venue and provide goods or services to users attending the venue. One or more parking lots, each including spaces for one or more vehicles, are also associated with the venue to allow users to more easily attend the venue.

To improve communication with users, a venue management system is associated with the venue and allows an administrator, or other user authorized by the administrator, to configure notifications to send to users at the venue or within a threshold distance of the venue. An administrator communicates with the venue management system to configure a notification. When configuring a notification, the administrator provides notification information to the venue management system for inclusion with the notification. The notification information may include one or more of: text, audio, images, animations, and video content. For example, the notification information includes text and images identifying a promotion being run by a vendor, text and audio or video initiating a chant in support of a team playing at the venue, or text, images, or video identifying the fastest route for exiting a parking lot associated with the venue.

Additionally, the administrator provides criteria to the venue management system describing conditions to be met for the notification to be transmitted to users. The criteria may be related to an event occurring at the venue, to a vendor, to a user, to a promotion, to a raffle or to anything else happening at the venue. For example, if the venue is hosting a sports game, such as a professional football game, the criteria indicate that the notification be provided to users if the visiting team's score at the end of the game is less than a threshold and the home team won the game. As another example, the criteria indicate that the notification be provided if the number of transactions processed by a vendor in the last 30 minutes is below a threshold. In this example, the number of transactions being below the threshold indicates that business for the vendor is slow. Accordingly, sending a notification (e.g., with a coupon or offer) to users when the vendor's business is slow can encourage users to visit the vendor to increase its business.

Further, the administrator provides user targeting information to the venue management system indicating users who are to be targeted with the notification. In various embodiments, users are targeted based on their current location at or within a threshold distance of the venue. For example, the user targeting information indicates that the notification be sent to users associated with client devices having locations in a specific region of the venue or in a parking lot associated with the venue. User targeting information also allows users to be targeted with the notification based on locations assigned to the users. For example, when a user purchases a ticket for an event hosted at the venue, the user is assigned a location (e.g., a seat) within the venue that is identified to the venue management system in association with an identifier of the user. The administrator may provide user targeting information to the venue management system to the notification be sent to users assigned to locations within a specific region of the venue.

The venue management system stores the notification along with the criteria for presenting the notification and the user targeting information received from the administrator when configuring the notification. The venue management system also receives and stores information received from users' client devices and other systems indicating locations associated with users within or within a threshold distance of the venue. The information may indicate the current location of a user's device or a location assigned to the user in the venue. Additionally, the venue management system receives information associated with an event hosted at the venue. For example, for a sporting event the venue management system receives information indicating the amount of time remaining for the event, a current score, and recent plays that occurred. The venue management system also receives and stores information associated with the vendors of the venue, such as products sold by a vendor, and an amount of inventory remaining for one or more products provided by the vendor.

Based on the information gathered by the venue management system, the venue management system determines whether at least a threshold amount of criteria of one or more stored notifications are satisfied. If the criteria of a notification are satisfied, the venue management system sends the notification to users having locations satisfying the user targeting information of the notification. In some embodiments, a notification may be associated with user targeting information and not with other criteria, so the venue management system sends the notification to users having a location or an assigned location satisfying the user targeting information associated with the notification.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
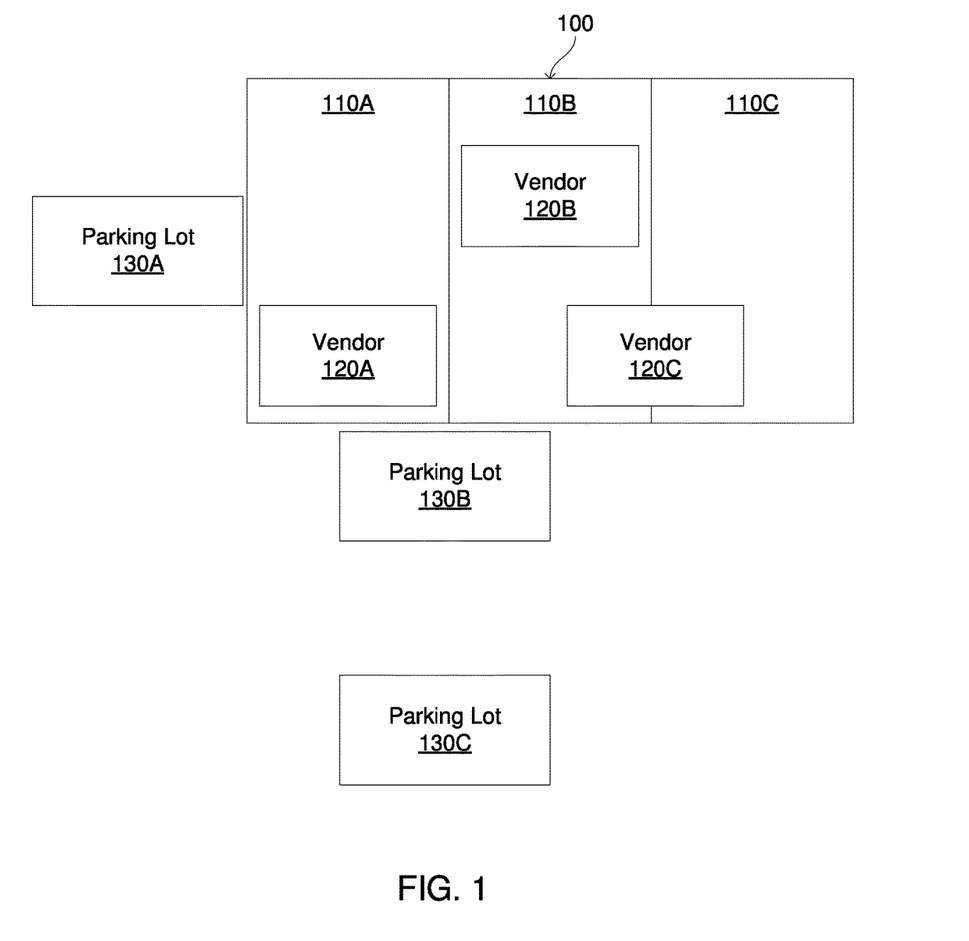
FIG. 1 is a block diagram of a venue, in accordance with an embodiment of the invention.

FIG. 1 is a block diagram of one embodiment of a venue 100. In the example of FIG. 1, the venue 100 includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Events are hosted at the venue 100. Examples of a venue 100 include a stadium, a convention center, an arena, a theater, an amphitheater, a theme park, or other suitable structure. One or more regions 110 are included in the venue 100, with each region 110 corresponding to an area within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region 110 identifying the specific seat. While FIG. 1 shows an example venue 100 including three regions 110A, 110B, 110C, in other embodiments, a venue 100 may include any number of regions 110.

One or more vendors 120 are included in the venue 100, with each vendor 120 providing products or services to users within the venue 100. Examples of vendors 120 include restaurants, food service providers, beverage providers, merchandise retailers, or other suitable entities providing products or services. Different vendors 120 may be associated with different regions 110 of the venue 100. For example, a vendor 120A is associated with a region 110A, while a different vendor 120B is associated with a different region 110B. A vendor 120 may be associated with multiple regions 110; for example, a vendor 120C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 100 and identify areas designated for parking vehicles. Each parking lot includes one or more spaces, each space for parking a vehicle. A price is associated with each parking lot 130 specifying an amount of compensation a user provides to an entity associated with the venue 100 for a space in the parking lot 130 to be allocated for parking a vehicle. Different parking lots 130 may have different distances from the venue 100, and prices associated with different parking lots 130 may be inversely proportional to a distance between a parking lot 130 and the venue 100. Each parking lot 130 is also associated with a capacity specifying a maximum number of vehicles that may be parked in a parking lot 130. The capacity may be a total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
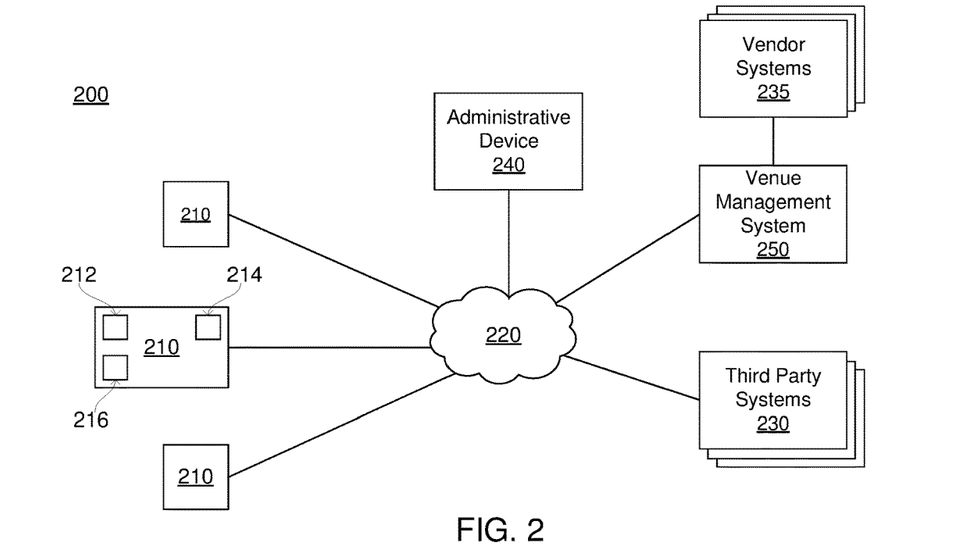
FIG. 2 is a block diagram of a system environment including a venue management system, in accordance with an embodiment.

FIG. 2 is a block diagram of a system environment 200 for a venue management system 250. The system environment 200 shown by FIG. 1 includes various client devices 210, a network 220, one or more third party systems 230, one or more vendor systems 235, an administrative device 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting or receiving data via the network 220. In one embodiment, the client device 210 is a conventional computer system, such as a desktop computer or a laptop computer. Alternatively, a client device 210 may be a device having computer functionality, such as a personal digital assistant (PDA), a mobile telephone, a smartphone, a smartwatch, or another suitable device. A client device 210 is configured to communicate with other devices via the network 220.

A display device 212 included in a client device 210 presents content to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 210 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device 210 may include multiple input devices 214 in some embodiments. Inputs received via the input device 214 may be processed by an application associated with the venue management system 250 and executing on the client device 210 to allow a client device user to exchange information with the venue management system 250.

Additionally, a client device 210 may include one or more position sensors 216, which determine a geographic location associated with the client device 210. For example, a position sensor 216 is a global positioning system (GPS) sensor that determines a geographic location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 210. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216. In one embodiment, the one or more position sensors 216 are sufficiently accurate to determine whether the client device 210 is located in a region 110 of the venue 100 or any other area associated with the venue 100 (e.g., a parking lot 130).

In one embodiment, when the client device 210 communicates with the venue management system 250, the client device 210 provides the client device's current location as determined by the one or more position sensors 216. In one embodiment, the current location is provided with specific communications, such as when communicating with the venue management system 250 to place an order with a vendor 120, but not with other communications. In one embodiment, the current location is only provided when the client device 210 is at the venue 100 or within a certain distance of the venue 100. In one embodiment, the current location is only provided when the user of the client device 210 authorizes the sharing of location information.

In one embodiment, the client device 210 executes an application allowing a user of the client device 210 to interact with the venue management system 250. For example, the client device 210 executes a browser application to enable interaction with the venue management system 250 or with one or more third party systems 230 via the network 220. In another embodiment, a client device 210 interacts with the venue management system 250 through an application programming interface (API) running on a native operating system of the client device 210, such as IOS® or ANDROID™. In one embodiment, the application or the API are specifically designed for communicating with the venue management system 250.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

The one or more third party systems 230 communicate with one or more client devices 210 or with the venue management system 250. In one embodiment, a third party system 230 is an application provider communicating information describing applications for execution by a client device 210 or communicating data to client devices 210 for use by an application executing on the client device 210. In other embodiments, a third party system 230 provides content or other information for presentation via a client device 210. For example, a third party system 230 provides content related to an event occurring at the venue 100 to a client device 210 for presentation to a user; as an example, the third party system 230 provides video or audio data of a portion of an event occurring at the venue 100 to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections.

A third party system 230 may also communicate information to the venue management system 250. In one embodiment, a third party system 230 provides the venue management system 250 with information associated with an event occurring at the venue 100. For example, for a sporting event occurring at the venue 100, a third party system 230 provides information describing the current score, timing information for the event (e.g., current quarter/period/inning and amount of time remaining/elapsed), plays that occurred, player statistics, players currently playing, substitute players available, a box score, etc.

Further, a third party system 230 may send to the venue management system 250 safety information associated with the venue 100. For example, the safety information may indicate a traffic accident near the venue 100, disorderly conduct by one or more users at the venue 100, a natural disaster or terrorist act that occurred or any other information that may affect the security of one or more users at the venue 100. Additionally, a third party system 230 may provide information related to one or more parking lots 130 associated with the venue 100, such as a number of available parking spaces in a parking lot 130, a number of parking spaces in a parking lot 130 that have been purchased, and a price associated with parking in a parking lot 130. A third party system 230 may also send to the venue management system 250 weather information, such as information describing the current weather conditions and forecasted weather conditions for an event hosted at the venue 100.

In one embodiment, a user may authorize a third party system 230 to provide to the venue management system 250 information stored by the third party system 230 that is associated with the user. For example, a third party system 230 may be a social networking system and a user authorizes the venue management system 250 to receive social networking information of the user from the third party system 230, such as connections of the user in a social network, social content generated by the user, and social actions taken by the user. In one embodiment, at least a portion of information sent by a third party system 230 to the venue management system 250 is subsequently communicated to one or more client devices 210.

One or more vendor systems 235 are coupled to the venue management system 250 via the network 220 or through direct connections between the vendor systems 235 and the venue management system 250. A vendor system 235 is associated with a vendor 120 and receives orders for products or services from the venue management system 250 and provides the products or services identified by the orders. Further, a vendor system 235 provides the venue management system 250 with information associated with the fulfillment of orders by a vendor 120 of the vendor system 235. For example, the vendor system 235 provides information to the venue management system 250 specifying an estimated time to fulfill subsequently received or pending orders for products or services, an average time in which previously received orders were fulfilled, a number of unfulfilled orders received by the vendor system 235, a total number of orders received by the vendor system 235 during different time periods or other suitable information. Information provided from the vendor system 235 to the venue management system 250 accounts for orders received via the venue management system 250 as well as orders received by the vendor 120 associated with the vendor system 235 from users visiting a location associated with the vendor 120.

Additionally, a vendor system 235 provides information to the venue management system 250 describing products or services sold by a vendor 120 associated with the vendor system 235. For example, the vendor system 235 can provide information on a number of different products or services sold by the vendor 120 or an amount of revenue received by the vendor 120 in exchange for different products or services. A vendor system 235 may also provide the venue management system 250 with information describing an amount of inventory a vendor 120 has remaining for different products or services. Information describing sold items or remaining inventory may be communicated from the vendor system 235 to the venue management system 250 as the products or services are sold or may be communicated from the vendor system 235 to the venue management system 250 at periodic intervals. Additionally, the venue management system 250 may request information describing sales of products or services from a vendor system 235, which provides the requested information to the venue management system 250 in response to receiving the request.

The administrative device 240 is a computing device used by one or more administrators of the venue management system 250 to communicate with the venue management system 250 via the network 220 or directly to configure notifications to send to users. An administrator of the venue management system 250 is a user of the venue management system 250 authorized to perform certain actions via the venue management system 250. An administrator may be, for example, a host of an event occurring at venue 100, part of managing the venue 100, or any other person that has authority to communicate with users visiting the venue 100. Examples of an administrative device 240 include: a desktop computer, a laptop computer or a mobile telephone. Similar to a client device 210, the administrative device 240 may include a display device 212, input devices 214, and positions sensors 216, as further described above. As described in more detail below in conjunction with FIG. 3, through the administrative device 240, the administrator provides the venue management system 250 information for configuring notifications to send to users. In other embodiments, the administrator provides information for configuring notifications to send to users by directly interacting with the administrative device 240 or through any other suitable communication channel.

The venue management system 250, which is further described below in conjunction with FIG. 3, manages communications with users. The venue management system 250 allows an administrator of the administrative device 240 to configure notifications to send to users. The notifications provide users with information related to the venue 100, such as information that will improve a user's experience at the venue 100 or promotional information for vendors 120 located at the venue 100. When an administrator configures a notification with the venue management system 250, the venue management system 250 receives from the administrator criteria describing conditions that when satisfied cause the notification to be sent to users for presentation (e.g., sent to client devices 210 associated with users). The venue management system 250 also receives user targeting information indicating characteristics of users who are eligible to receive the notification when at least a threshold amount of criteria of the notification are satisfied.

Further, the venue management system 250 receives information from the third party systems 230 and from the vendor system 235. Based on the received information, the venue management system 250 determines whether at least a threshold amount of criteria of one or more notifications are satisfied. If the venue management system 250 determines at least the threshold amount of the criteria of a notification have been satisfied, the venue management system 250 sends the notification to client devices 210 users having characteristics that satisfy the user targeting information of the notification.

Figure 3:
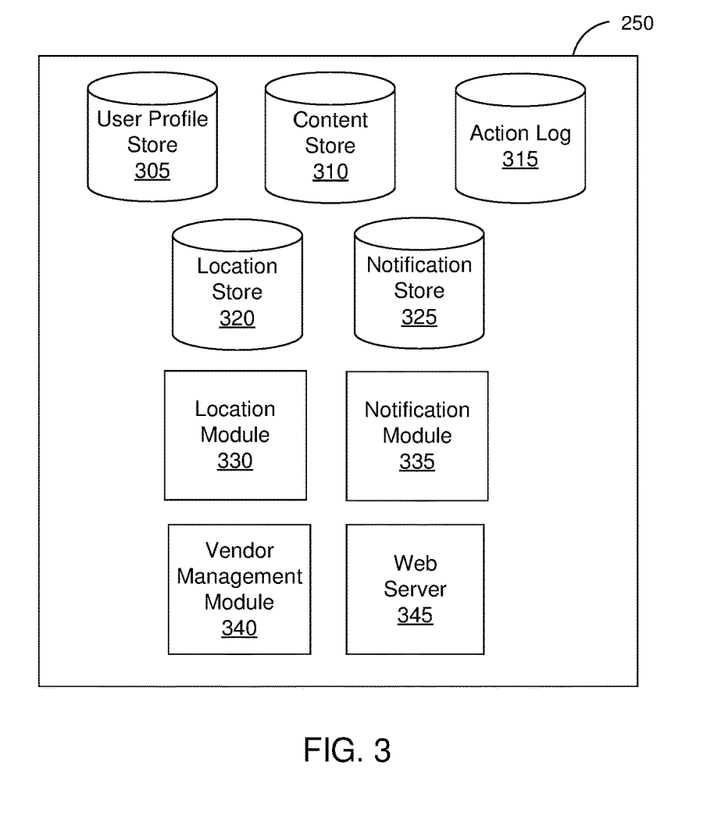
FIG. 3 is a block diagram of a venue management system, in accordance with an embodiment.

FIG. 3 is a block diagram of an architecture of the venue management system 250. In the example of FIG. 3, the venue management system 250 includes a user profile store 305, a content store 310, an action log 315, a location store 320, a notification store 325, a location module 330, a notification module 335, a vendor management module 340, and a web server 345. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

In one embodiment, each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, and preferences.

In one embodiment, a user profile includes location information of a user associated with the profile. The location information indicates a location of the venue 100 assigned to the user, also referred to herein as an "assigned location." In one embodiment, the assigned location is determined for the user when the user purchases a ticket to attend the venue 100 for an event. The assigned location may be, for example, a region 110 of the venue 100 or a seat within a region 110. In one embodiment, when the user purchases a ticket, a system that processed the purchase provides information to the venue management system 250 including an identifier of the user and an indication of the assigned location determined for the user. The venue management system updates the user profile of the user to include the assigned location.

A user profile may also store other information provided by a user, for example, image data or video data. Additionally, a user profile in the user profile store 305 may also maintain references to actions by the corresponding user performed on content presented to the user by the venue management system 250 or interactions by the user with the venue management system 250. For example, a user profile identifies prior orders for products or services received by the venue management system 250 from a user associated with the user profile.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

In one embodiment, each user's user profile also stores authentication information identifying a corresponding user. For example, a user profile includes a user name and password associated with the user. The authentication information is used by the venue management system 250 to verify the identity of a user. In one embodiment, for a user to initiate a communication session with the venue management system 250 via a client device 210, the user provides its authentication information, and the venue management system 250 establishes the communication session if the authentication information matches authentication information stored in a user profile.

The content store 310 stores content objects that each represent information received from a third party system 230 or a vendor system 235. Information represented by an object may also be generated by the venue management system 250. Examples of information represented by an object include video data associated with an event occurring at the venue 100, audio data associated with an event occurring at the venue 100, text data associated with an event occurring at the venue 100 (e.g., a score, timing information, plays that occurred, player statistics, and a box score for a sporting event), safety information associated with the venue 100, information related to parking lots 130 associated with the venue 100, weather information associated with the venue 100, information related to a vendor 120, and information related to products or services sold by vendors 120.

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-in to the venue 100, interacting with a notification provided by the venue management system 250, providing a review of a product, service, or vendor 120 to the venue management system 250 or to a third party system 230 that communicates with the venue management system 250, providing a comment associated with the venue 100 or with an event occurring at the venue 100 to the venue management system 250 or to a third party system 230 that communicates with the venue management system 250. Any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the venue management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. The location store 320 also includes physical locations for other areas associated with the venue 100, such as parking lots 130.

Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

The location store 320 also stores location information obtained by the venue management system 250 for users. In one embodiment, for each user, the location store 320 stores a history of locations where the user has been located. In another embodiment, the location store 320 stores most recently received location information obtained for each user, but does not store earlier received location information obtained for a user. The location information stored by the location store 320 for a user may indicate, for example, geographic coordinates (e.g., latitude and longitude) of the user's location and/or an area associated with the venue 100 (e.g., a region 110 or parking lot 130) that includes the user's location. Additional information regarding obtaining location information for users is further described below in conjunction with the location module 330.

The notification store 325 stores notifications configured by administrators for users of the venue management system 250. Each notification stored by the notification store 325 includes notification information that is presented to users as part of the notification. Notification information may include one or more of the following: text, audio, images, animations, and video content. In one embodiment, instead of a stored notification including notification information that is to be presented to a user, the stored notification may include a link to the information that is to be presented. For example, if a notification is to include a video, the notification includes a link that retrieves the video for presentation when accessed by a user.

A notification stored by the notification store 325 also includes criteria that specify conditions for transmitting the notification to client devices 210 associated with users. When at least a threshold amount of the criteria are satisfied, the notification is eligible to be transmitted to client devices 210 associated with users. The criteria may be related to one or more of the following: an event occurring at the venue 100, an event outside of the venue 100 (e.g., in a parking lot 130 associated with the venue 100), a vendor 120, a user, an employee, a promotion, a raffle, a time of day, weather conditions, a region 110 of the venue 100, an area associated with the venue 100, a product, and a service.

Additionally, a notification stored by the notification store 325 includes user targeting information identifying characteristics of users eligible to be presented with the notification. When at least the threshold amount of the criteria of the notification are satisfied, the notification is eligible to be presented to users having characteristics satisfying at least a threshold amount of the user targeting information. The user targeting information may indicate one or more regions 110 of the venue 100 and/or one or more areas (e.g., parking lots 130) associated with the venue 100 so a notification including the user targeting information is presented to users associated with a location indicated by the user targeting information but is not presented to users associated with other locations outside of location indicated by the user targeting information. The user targeting information may specify a location associated with a client device within a region 110 or an area associated with the venue 100 or may specify an assigned location of a user within the region or the area associated with the venue 100 for a user to be eligible to receive a notification. In some embodiments, the user targeting information may include the identifiers of specific users of the venue management system 250 to receive the notification.

In one embodiment, a stored notification identifies different notification information to be communicated to different users by associating different notification information with different user targeting information. For example, a notification includes notification information of "Event is about to start, get in here!" associated with user targeting information identifying locations outside the venue 110 and alternative notification information of "Make some noise!" with alternative user targeting information identifying locations inside the venue 100.

Below are additional examples of information that may be included with a notification stored by the notification store 325.

Example A: A notification includes notification information having a voucher redeemable for a free product or service, includes criteria for presenting the notification information at the end of a sporting event when the home team won, and includes user targeting information indicating the notification information is presented to users associated with locations within the venue 100.

Example B: A notification includes notification information that is a promotion for a product (e.g., 50% off hot dogs for a particular duration), criteria for presenting the notification information indicating a vendor 120 has at least a threshold inventory of the product after a certain amount of time has elapsed for an event occurring at the venue 100 (e.g., at the end of the third quarter of a sporting event), and user targeting information identifying users having an assigned location within a common region 110 as the vendor 120.

Example C: A notification includes notification information that is a message promoting the products or services offered by a vendor 120, criteria for presenting the notification information indicating a number of transactions processed by a vendor 120 is below a threshold, and user targeting information identifying users currently located in a common region 110 of the venue 100 as the vendor 120 or in regions 110 of the venue 100 within a threshold distance of the vendor 120.

Example D: A notification includes notification information that identifies an estimated time for a vendor 120 to fulfill orders, criteria for presenting the notification information indicating the estimated time for the vendor 120 to fulfil orders is below a threshold amount of time, and user targeting information identifying user having an assigned location in a common region 110 as the vendor 120.

Example E: A notification includes notification information describing products useful during raining conditions (e.g., umbrellas, rain ponchos), criteria for presenting the notification information specifying weather conditions indicating it's raining during an event hosted at the venue 100, and user targeting information identifying users associated with locations within a threshold distance of the venue 100.

Example F: A notification includes notification information that is a message indicating that a user won a prize and for the user to go to a specific region 110 of the venue 100 to collect the prize and user targeting information identifying a user profile selected from the user profile store 305 (e.g., a randomly selected user profile, a user profile having one or more particular characteristics).

Example G: A notification includes notification information comprising a contact number for use if users observe disorderly conduct, criteria for presenting the notification information indicting prior receipt of at least a threshold number of reports of disorderly conduct from a region 110 of the venue, and user targeting information identifying user having either an assigned location or a location obtained from a client device 210 within the region 110.

Example H: A notification includes notification information providing directions to reach a highway nearest the venue 100 via a route with the least amount of traffic, criteria for presenting the notification information specifying an event hosted at the venue 100 has ended, and user targeting information identifying a location of a user (e.g., a location received from a client device 110 associated with the user) within a parking lot 130 associated with the venue 100.

Example I: A notification includes notification information identifying a number of available parking spaces in various parking lots 130 and user targeting information identifying users having locations received from associated client devices 110 within a threshold distance of one or more parking lots 130 associated with the venue 100.

The location module 330 tracks location information for users of the venue management system 250 by monitoring information received by the venue management system 250 for information indicating a current physical location or geographic location of a user. In one embodiment, the location module 330 monitors information stored in the content store 310 and/or the action log 315 to determine when information is received by the venue management system 250 that indicates the location of a user. The location module 330 may periodically monitor information received by the venue management system 250 for users' physical locations or geographic location or may monitor information as the information is received by the venue management system 250.

A user's current location may be provided by the user's client device 210 when the user communicates with the venue management system 250. For example, when the user communicates with the venue management system 250 to place an order with a vendor 120, the user's client device 210 provides its current location so the order can be delivered to the user. A user may also request that his or her current location be provided to the venue management system 250, for example, so the user's current location can be shared with other users (often referred to as a check-in). Information indicating a user's location may also be received by the venue management system 250 from one or third party systems 230. For example, a third party system 230 may be a social networking system and a user shares content (e.g., a photo, a message, a post, or a check-in) with the social networking system that includes the user's current location. The social networking system in turn shares the user's location from the content with the venue management system 250 if the user grants the venue management system 250 access to such information.

When the location module 330 determines that information has been received that indicates a current location of a user, the location module 330 stores the location information in the location store 320 in association with the user. The location information may be stored as geographical coordinates (e.g., latitude and longitude). In one embodiment, the location module 330 determines whether the user's location is within an area associated with the venue 100, such as a region 110 or a parking lot 130. The location module 330 determines whether the user's location is within an area associated with the venue 100 based on the physical location information stored by the location store 320 for the different areas associated with the venue 100 and the current location of the user. For example, for each area associated with the venue 100, the location store 320 includes boundary coordinates of the area. The location module 330 determines that an area associated with the venue 100 includes the user's current location if the current location is within boundaries of the area associated with the venue 100. If the location module 330 determines that an area associated with the venue 100 includes the user's current location, the location module 330 stores an identifier of the area including the user's current location along with location information associated with the user in the location store 330.

The notification module 335 manages configuration and distribution of notifications. When an administrator requests to configure a notification, the notification module 335 provides one or more interfaces for configuring the notification to the administrator. For example, the administrator communicates a request to configure a notification from the administrative device 240 to the venue management system 250, and the notification module 335 communicates one or more interfaces to the administrative device 240 in response to receiving the request. Through the interfaces the administrator provides notification information for presentation by a notification, criteria for presenting the notification information, and user targeting information, which are further described above. The criteria indicate conditions that trigger sending of the notification information to one or more users when at least a threshold amount of the criteria are satisfied. The user targeting information identifies characteristics of users to receive the notification when at least the threshold amount of the criteria of the notification are satisfied. In some embodiments, the administrator identifies user targeting information and notification information so the notification information is presented to users having characteristics satisfying the user targeting information to configure a notification. The notification module 335 stores the information received for the notification through the one or more interfaces in the notification store 325 in association with the notification.

In one embodiment, the notification module 335 continuously determines whether criteria of one or more notifications stored in the notification store 325 are satisfied. In one embodiment, the notification module 335 monitors the information stored in the content store 310 and/or the action log 315 to determine whether the criteria of a notification have been satisfied. For example, based on information received from a third party system 230 and stored in the content store 310, the notification module 335 determines the amount of time remaining for a sporting event occurring at the venue 100 and a score associated with the sporting event. As another example, based on information received from a vendor system 235 and stored in the content store 310, the notification module 335 determines an amount of remaining inventory a vendor 120 has for a product. In another embodiment, the notification module 335 periodically determining whether information maintained by the venue management system 250 satisfies criteria for various notifications rather than continuously determining whether information maintained by the venue management system 250 satisfies criteria for various notifications.

If the notification module 335 determines that at least a threshold amount of the criteria of a notification are satisfied, the notification module 335 identifies user targeting information stored in the notification store 325 for the notification. As further described above, the user targeting information indicates characteristics of users to receive the notification. If the user targeting information of the notification indicates that users associated with locations within an area associated with the venue 100 are to receive the notification, the notification module 335 determines users are currently in the area based on the location information stored in the location store 320 for the users. If the user targeting information indicates that users assigned to locations within a region 110 of the venue 100 are to receive the notification, the notification module 335 determines users assigned to locations within the region 110 based on the information stored in user profiles maintained by the user profile store 305. The notification module 335 transmits the notification to the client devices 210 of the users determined to receive the notification based on the user targeting information.

The vendor management module 340 receives orders for products or services from client devices 210 associated with users and communicates the orders to one or more vendor systems 235 of vendors 120 associated with the venue 100. In various embodiments, the vendor management module 340 includes vendor profiles each associated with one or more vendors associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 235 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the venue management system 250 to modify regions 110 of the venue 100 associated with one or more vendors 120.

When the vendor management module 340 receives an order from a user identifying a product or service and identifying a vendor 120, the vendor management module 340 communicates the order to a vendor system 235 corresponding to the identified vendor 120. The vendor 120 may subsequently deliver the product or service identified by the order to the user or may communicate a message to the user via the venue management system 250 when the order is fulfilled. To expedite delivery of products or services, the vendor management module 340 may associate different vendors 120 with different regions 110 of the venue 100 to reduce time for users to receive products or services delivered by vendors 120. The vendor management module 340 may modify regions 110 of the venue 100 associated with a vendor 120 by modifying identifiers of regions 110 included in a vendor profile of a vendor 120. In some embodiments, the vendor management module 340 modifies regions 110 associated with a vendor 120 based on a number or a frequency of orders received from users associated with different regions 110 as well as a time to fulfill orders by different vendors 120, products or services offered by different vendors 120 or a number of orders received by different vendors 120. When modifying regions 110 associated with a vendor 120 or vendors 120 associated with a region 110, the venue management system 250 may account for products or services provided by various vendors 120 so similar products or services are provided to users in a region 110 before and after modification of the vendors 120 associated with the region 110.

Additionally, the vendor management module 340 receives information from a vendor system 235 and communicates the information to one or more client devices 210 for presentation to users. For example, the vendor system 235 communicates a time to fulfill an order, an estimated time to fulfill an order, a number of previously received orders that have yet to be fulfilled, or other suitable information to the vendor management module 340, which provides at least a subset of the information to a client device 210 for presentation to a user. As another example, a vendor system 235 communicates a message to the venue management module 330 including a user identifier, an order identifier (or a description of an order), and an indication that an order corresponding to the order identifier has been fulfilled by a vendor 120. The vendor management module 340 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 340 regulates communication of orders received from client devices 210 associated with users to vendor systems 235 associated with various vendors 120. When the vendor management module 340 receives an order for a product or a service from a client device 210 associated with a user, the vendor management module 340 stores the received order in a queue for a specified time interval before communicating the order to a vendor system 235 corresponding to a vendor 120 identified by the order. If the vendor management module 340 receives additional orders from users having one or more characteristics matching or similar to the order stored in the queue and identifying the vendor 120 identified by the order while the order is stored in the queue, the vendor management module 340 generates a group including the additional orders and the order stored in the queue and communicates the group or orders to a vendor system 235 associated with the vendor 120 to be fulfilled. For example, the vendor management module 340 generates a group including additional orders associated with users having a location matching a location of a user associated with an order stored in the queue. As additional examples, the vendor management module 340 generates a group including orders identifying products or services matching, or similar to, a product or a service specified by an order stored in the queue or generates a group including orders identifying products or services having times for fulfillment within a threshold value of a time for fulfillment of the order stored in the queue. Communicating a group of orders having one or more matching or similar characteristics to a vendor system 235 allows the vendor 120 associated with vendor system 235 to more efficiently fulfill orders from users.

The web server 345 links the venue management system 250 via the network 220 to one or more client devices 210, to one or more third party systems 230, and the administrative device 240. Additionally, the web server 345 may exchange information between the venue management system 250 and one or more vendor systems 235. The web server 345 serves web pages, as well as other content, such as JAVA®, FLASH®, XML and so forth. The web server 345 may receive and route messages between the venue management system 250 and a client device 210, for example, instant messages, queued messages (e.g., email), text messages, short message service (SMS) messages, or messages sent using any other suitable messaging technique. Additionally, the web server 345 may provide application programming interface (API) functionality to send data directly to native client device operating systems, such as IOS®, ANDROID™, or BlackberryOS.

Configuration and Distribution of Notifications

Figure 4:
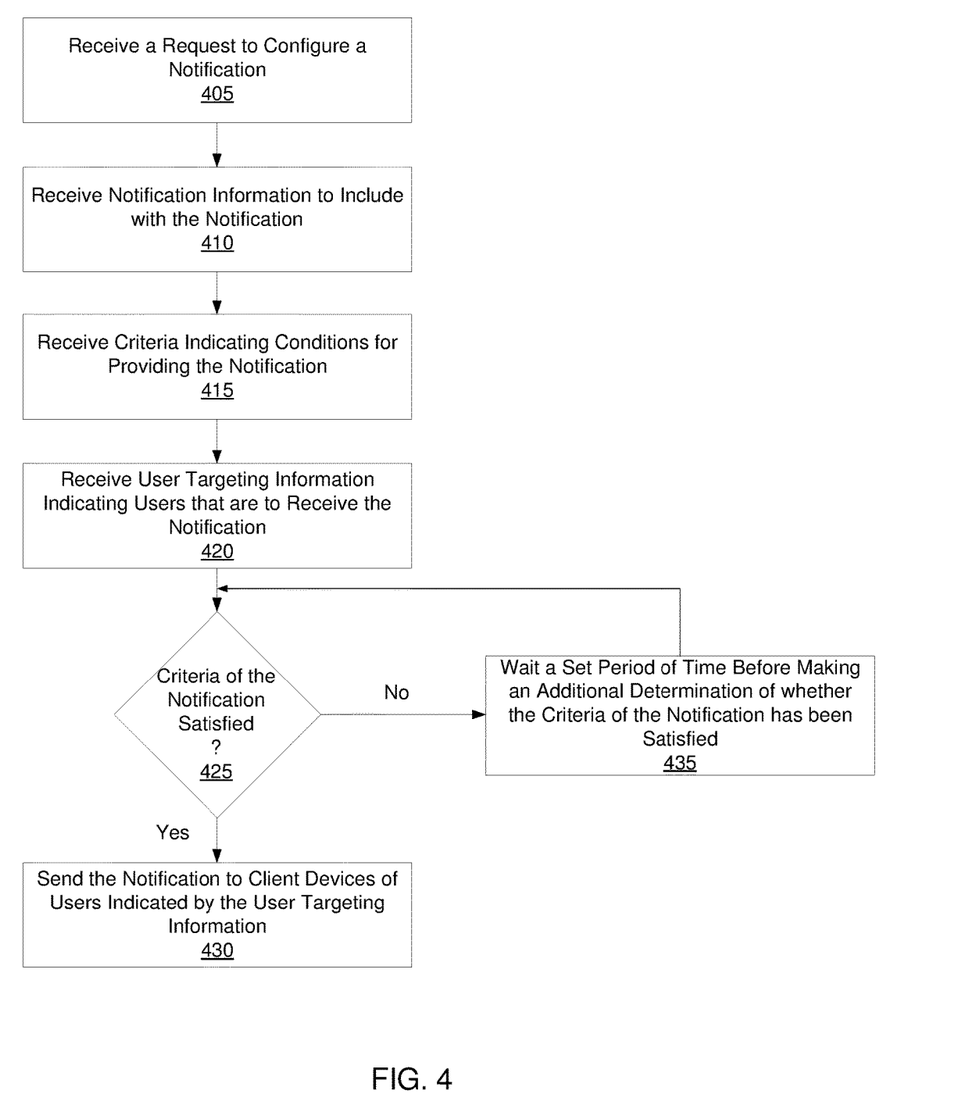
FIG. 4 is a flowchart illustrating a method for providing a notification from a venue management system to users based on locations of users within the venue, in accordance with an embodiment.

FIG. 4 is a flow chart illustrating one embodiment of a method for providing a notification from a venue management system 250 to users based on locations of users within the venue. In other embodiments, the method may include different and/or additional steps than those described in conjunction with FIG. 4. Additionally, in other embodiments, steps of the method may be performed in orders different than the order described in conjunction with FIG. 4.

The venue management system 250 receives 405 a request to configure a notification to provide to users of the venue management system 250. For example, the venue management system 250 receives 405 the request to configure the notification form the administrative device 240. As part of the request, the venue management system 250 receives 410 notification information for presentation to users via a notification, as further described above in conjunction with FIG. 3. The venue management system 250 also receives 415 criteria for a notification that describe conditions to be satisfied for the notification to be transmitted to users. Additionally, the venue management system 250 receives 420 user targeting information specifying characteristics of users eligible to be presented with the notification information included in the notification when at least a threshold amount of the criteria are satisfied. In various embodiments, the venue management system 250 receives 410 the notification information, receives 415 the criteria, and receives the user targeting information from the administrative device 240.

The venue management system 250 determines 425 whether at least a threshold amount of the criteria of the notification have been satisfied based on information received from third party systems 230, vendor systems 235, or client devices 210. In response to determining 425 at least the threshold amount of the criteria of the notification has been satisfied, the venue management system 250 sends 430 the notification to client devices 210 of users associated with characteristics satisfying at least a threshold amount of the user targeting information, as further described above in conjunction with FIG. 3. For example, the user targeting information indicates that the notification is sent to users associated with locations currently within specific areas associated with the venue 100. As another example, the user targeting information indicates that the notification is sent to users assigned to locations in regions 110 associated with the venue 100.

In various embodiments, if at least a threshold amount of the criteria of the notification has not been satisfied, the venue management system 250 waits 435 a set period of time and makes an additional determination of whether the threshold amount of the criteria of the notification are satisfied. After the set amount of time, the venue management system 250 determines 425 whether at least a threshold amount of the criteria of the notification have been satisfied, as further described above.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a venue management system associated with a venue, a notification including notification information for presentation to users of the venue management system and user targeting information identifying a parking lot associated with the venue;
storing, by the venue management system, criteria to be satisfied for the venue management system to provide the notification to the users;
receiving, by the venue management system, from a third party system information describing traffic in an area proximate to the venue;

determining a route from the parking lot associated with the venue to a highway nearest the venue based on the received information describing traffic in the area proximate to the venue;

including the determined route in the notification information of the notification;

determining, by the venue management system, the stored criteria are satisfied based on the vendor information;

responsive to determining that the stored criteria are satisfied, identifying, by the venue management system, users within a threshold distance of the parking lot associated with the venue based on location information received by the venue management system from client devices associated with the users, and identifying, by the venue management system, additional users assigned to locations within parking lot associated with the venue based on tickets to enter the venue obtained by the additional users; and sending, by the venue management system, the notification to the client devices associated with the identified users and to client devices associated the additional users, the notification information of the notification including the determined route.

2. The method of claim 1, wherein a sporting event occurs at the venue.

3. The method of claim 1, wherein the notification information includes video identifying the determined route.

4. The method of claim 1, wherein the venue comprises a stadium.

5. The method of claim 1, wherein the venue comprises an arena.

6. The method of claim 1, wherein the venue comprises a convention center.

7. A non-transitory computer-readable storage medium having instructions encoded thereon that, when executed by a processor, causes the processor to:

receive, by a venue management system associated with a venue, a notification including notification information for presentation to users of the venue management system and user targeting information identifying a parking lot associated with the venue;

storing, by the venue management system, criteria to be satisfied for the venue management system to provide the notification to the users;

receive, by the venue management system, from a third party system information describing traffic in an area proximate to the venue;

determine a route from the parking lot associated with the venue to a highway nearest the venue based on the received information describing traffic in the area proximate to the venue;

include the determined route in the notification information of the notification;

determine, by the venue management system, the stored criteria are satisfied;

responsive to determining that the stored criteria are satisfied, identify, by the venue management system, users within a threshold distance of the parking lot associated with the venue based on location information received by the venue management system from client devices associated with the users, and identify, by the venue management system, additional users assigned to locations within parking lot associated with the venue based on tickets to enter the venue obtained by the additional users; and send, by the venue management system, the notification to the client devices associated with the identified users and to the client devices associated with the additional users, the notification information of the notification including the determined route.

8. The non-transitory computer readable storage medium of claim 7, wherein a sporting event occurs at the venue.

9. The non-transitory computer readable storage medium of claim 7, wherein the notification information includes video identifying the determined route.

10. The non-transitory computer readable storage medium of claim 7, wherein the venue comprises a stadium.

11. The non-transitory computer readable storage medium of claim 7, wherein the venue comprises an arena.

12. The non-transitory computer readable storage medium of claim 7, wherein the venue comprises a convention center.

13. A venue management system comprising:

a processor;

a non-transitory computer-readable storage medium coupled to the processor and comprising computer program code that, when executed by the processor, causes the processor to:

receive, by a venue management system associated with a venue, a notification including notification information for presentation to users of the venue management system and user targeting information identifying a parking lot associated with the venue;

store, by the venue management system, criteria to be satisfied for the venue management system to provide the notification to the users;

receive, by the venue management system, from a third party system information describing traffic in an area proximate to the venue;

determine a route from the parking lot associated with the venue to a highway nearest the venue based on the received information describing traffic in the area proximate to the venue;

include the determined route in the notification information of the notification;

determine, by the venue management system, the stored criteria are satisfied;

responsive to determining that the stored criteria are satisfied, identify, by the venue management system, users within a threshold distance of the parking lot associated with the venue based on location information received by the venue management system from client devices associated with the users, and identify, by the venue management system, additional users assigned to locations within parking lot associated with the venue based on tickets to enter the venue obtained by the additional users; and send, by the venue management system, the notification to the client devices associated with the identified users and to the client devices associated with the additional users, the notification information of the notification including the determined route.

14. The venue management system of claim 13, wherein a sporting event occurs at the venue.

15. The venue management system of claim 13, wherein the venue comprises a stadium.

16. The venue management system of claim 15, wherein the venue comprises an arena.

* * * * *

UNITED STATES PATENT AND TRADEMARK OFFICE
CERTIFICATE OF CORRECTION

Page 1 of 1

PATENT NO. : 10,015,270 B2
APPLICATION NO. : 15/724393
DATED : July 3, 2018
INVENTOR(S) : John M. Paul et al.

It is certified that error appears in the above-identified patent and that said Letters Patent is hereby corrected as shown below:

In the Claims

Column 19, Line 23, Claim 1, delete "assoicated" and insert --associated--

Signed and Sealed this
Twelfth Day of November, 2019

Andrei Iancu
*Director of the United States Patent and Trademark Office*